Aug. 2, 1927.
A. NOSAN
1,637,871
WALL CONSTRUCTION FOR AEROPLANE FUSELAGES
Filed July 26, 1926
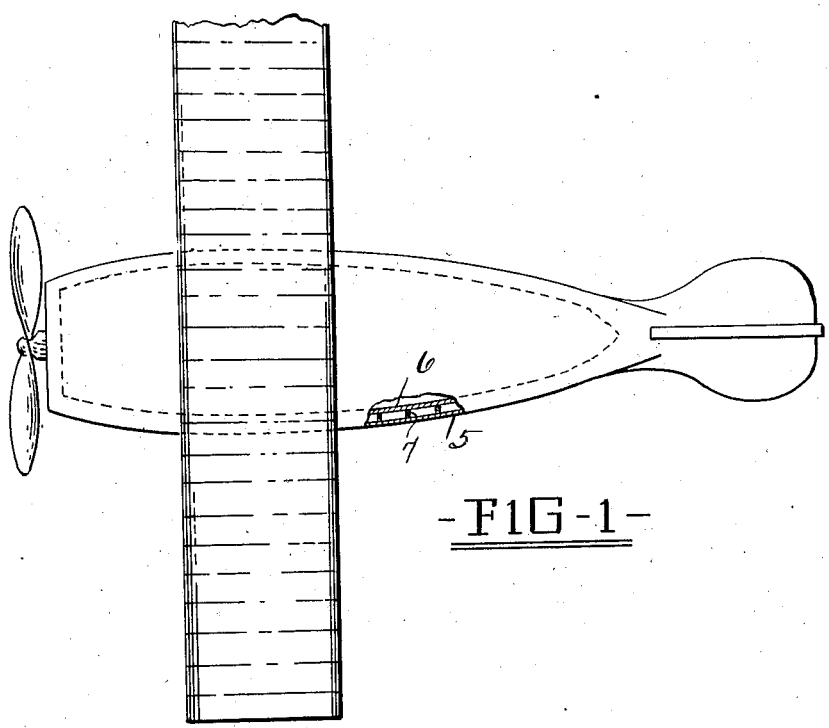
-FIG-1-
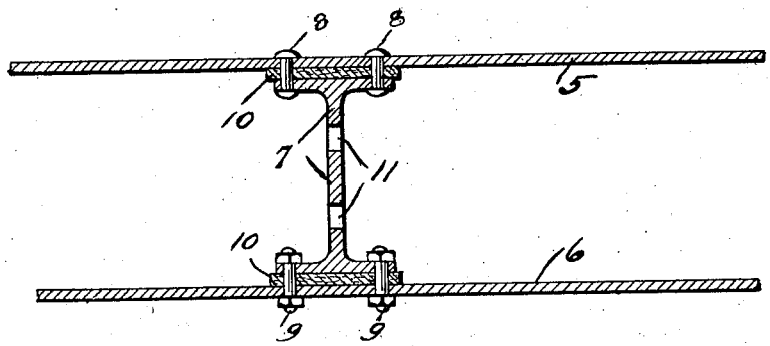
-FIG-2-
INVENTOR.
Anton Nosan
BY
John A. Bonnhardt
ATTORNEY.

Patented Aug. 2, 1927.

1,637,871

UNITED STATES PATENT OFFICE.

ANTON NOSAN, OF CLEVELAND, OHIO.

WALL CONSTRUCTION FOR AEROPLANE FUSELAGES.

Application filed July 26, 1926. Serial No. 124,951.

This invention relates to wall constructions for aeroplane fuselages. For various reasons it is desirable to insulate aeroplane bodies or fuselages against heat or cold, because of the temperature conditions met with in the use of such machines, and it is the object of the present invention to provide means for doing this, thereby preventing excessive heat exchange or conduction between the interior and the exterior of the fuselage.

This object is accomplished by making a double walled fuselage or body with a vacuum between the walls, the heat insulating properties of a vacuum being well-known. At the same time, collapse of the walls must be prevented incident to the difference of pressure.

The accompanying drawings illustrate an embodiment of this idea, Fig. 1 being a plan of an aeroplane, with parts broken away or omitted, constructed according to the invention. Fig. 2 is a detail in section.

As shown in the drawings, the fuselage consists of an outer skin or wall 5 and an inner wall 6, these being spaced apart. These walls will be made air tight with respect to the space between them, and by any suitable means the air will be exhausted to form the desired vaccum. For supporting the walls against pressure, and maintaining the same in spaced relation, I provide ribs or beams 7, conveniently of I sections the flanges of which are bolted to the walls as indicated at 8 or are fastened in any other suitable way, and a packing 10 of asbestos or other suitable material is clamped between the walls and the beams to make an air tight joint at the bolts, and prevent conduction of heat thru the ribs between the walls; the beams may be perforated at 7 for communication between the sections, or the beams may be made solid, or the space between the walls otherwise divided into compartments from which the air may be exhausted by any suitable means. As many beams will be used as may be desired or necessary, according to the strength desired or the resistance to be supported.

This construction has the advantage of lightness so desirable in aerial structures. The walls are preferably made of aluminum or other metal or alloys thereof and when so constructed will be light and strong and have the high insulating qualities referred to, being thereby superior to the insulating packing or fillings of any kind, with respect both to heat insulating qualities and also with respect to lightness and cheapness of construction.

I claim:

An aeroplane fuselage having double air tight walls with a vacuum space therebetween and ribs at intervals between the walls in said space, said ribs being fixed to the respective walls, and heat insulating packing between the ribs and the walls.

In testimony whereof, I do affix my signature.

ANTON NOSAN.